United States Patent [19]

Kato

[11] Patent Number: 5,514,809

[45] Date of Patent: May 7, 1996

[54] SILVER HALIDE PHOTOGRAPHIC MATERIAL

[75] Inventor: Takashi Kato, Kanagawa, Japan

[73] Assignee: Fuji Photo Film Co., Ltd., Kanagawa, Japan

[21] Appl. No.: 293,604

[22] Filed: Aug. 22, 1994

Related U.S. Application Data

[63] Continuation of Ser. No. 26,290, Mar. 4, 1993, abandoned.

[30] Foreign Application Priority Data

Mar. 5, 1992 [JP] Japan ................ 4-048713

[51] Int. Cl.$^6$ ................ G03C 1/005; G03C 1/494; C07D 277/64
[52] U.S. Cl. ................ 548/156; 430/576; 430/584; 548/150
[58] Field of Search ................ 548/156, 150, 548/219

[56] References Cited

U.S. PATENT DOCUMENTS

| | | | |
|---|---|---|---|
| 2,481,022 | 9/1949 | Kendall et al. | 548/156 |
| 2,756,227 | 7/1956 | Heseltine | 548/156 |
| 2,955,939 | 10/1960 | Brookes et al. | 548/156 |
| 4,680,375 | 7/1987 | Elmasry | 528/253 |

FOREIGN PATENT DOCUMENTS

| | | |
|---|---|---|
| 0364990 | 4/1990 | European Pat. Off. . |
| 0368356 | 5/1990 | European Pat. Off. . |
| 0432473 | 6/1991 | European Pat. Off. . |
| 4146428 | 5/1992 | Japan . |

Primary Examiner—Johann Richter
Assistant Examiner—Laura R. Cross
Attorney, Agent, or Firm—Sughrue, Mion, Zinn, Macpeak & Seas

[57] ABSTRACT

A novel silver halide photographic material is disclosed, which comprises at least one methine dye represented by the following formula (I):

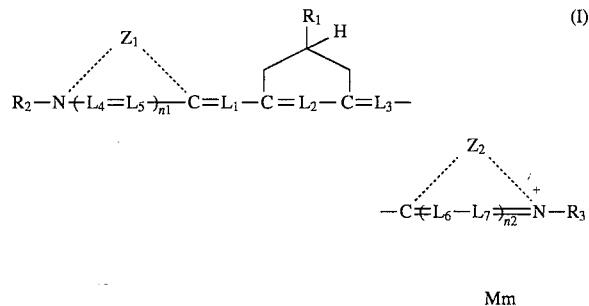

wherein $Z_1$ and $Z_2$ each represents an atomic group required for the formation of a 5- or 6-membered nitrogen-containing heterocyclic nucleus; $R_1$ represents an alkyl, aryl or heterocyclic group; $R_2$ and $R_3$ each represents an alkyl group, with the proviso that at least one of $R_2$ and $R_3$ represents an alkyl group substituted by an alkoxy or aryloxy group; $L_1$, $L_2$, $L_3$, $L_4$, $L_5$, $L_6$, and $L_7$ each represents a methine group which may be substituted or unsubstituted; $n_1$ and $n_2$ each represents an integer 0 or 1; M represents a charge neutralizing ion; and m represents 0 or a higher number required for the neutralization of electric charge in the dye.

9 Claims, 1 Drawing Sheet

SILVER HALIDE PHOTOGRAPHIC MATERIAL

This is a Continuation of application Ser. No. 08/026,290 filed Mar. 4, 1993 now abandoned.

FIELD OF THE INVENTION

The present invention relates to a methine compound and a silver halide photographic material containing such a methine compound. More particularly, the present invention relates to a cyanine dye containing a specific crosslinking group on a methine chain and a silver halide photographic material containing such a cyanine dye.

BACKGROUND OF THE INVENTION

Spectral sensitization is an extremely important and essential technique in the preparation of a high sensitivity stable silver halide photographic materials. Heretofore, various spectral sensitizers have been developed. At the same time, technical developments have been made in the usage of these spectral sensitizers, e.g., how they can be used for supersensitization, how they can be added to materials.

It has been known that spectral sensitizing dyes for spectral sensitization include spectral sensitizers such as cyanine dyes, melocyanine dyes and rhodacyanine dyes used singly or in combination (e.g., for supersensitization).

In order to serve as sensitizing dyes, they are required to provide a high spectral sensitivity as well as to meet many other requirements. For example, they must give no fog sensitization. They also must exhibit excellent properties upon exposure, e.g., latent image stability, reciprocity characteristics, temperature and humidity dependence, upon exposure. Further, when unexposed, such sensitizers must show little change in the sensitivity, gradation and fog from before to after storage. Moreover, they must not remain in the light-sensitive material after development.

Among these requirements, the high sensitivity and high storage stability are essential. Many efforts have been made to meet these requirements. These efforts are described in JP-A-60-202436, JP-A-60-220339, JP-A-60-225147, JP-A-61-123834, JP-A-62-87953, JP-A-63-264743, JP-A-1-15534, JP-A-1-177533, JP-A-1-198743, JP-A-1-216342, JP-A-2-42 (the term "JP-A" as used herein means an "unexamined published Japanese patent application"), JP-B-60-57583 (the term "JP-B" as used herein means an "examined Japanese patent publication"), and U.S. Pat. No. 4,618,570.

However, the level of the sensitivity and storage stability attained by these efforts leaves much to be desired.

In silver halide photographic materials, it is important to incorporate various dyes into the materials to enhance the sharpness and color separability thereof.

On the other hand, supersensitization is described in *Photographic Science and Engineering*, vol. 13, pp. 13–17 (1969), and vol. 18, pp. 418–430 (1974), and James, *The Theory of the Photographic Process*, 4th ed., page 259 (Macmillan, 1977). It is known that the selection of proper sensitizing dyes and supersensitizer can give a high sensitivity.

A dye in which the 2'-position in the propylene crosslink attached to the 2- and 4-positions on the methine chain is mono-substituted is described in British Patents 595,783, 595,784, 595,785 and 604,217, and U.S. Pat. Nos. 2,481,022 and 2,756,227. Referring to its spectral sensitizing capacity in a silver halide system, U.S. Pat. No. 2,481,022 states that the spectral sensitization of silver bromoiodide with such a dye gives a spectral sensitivity maximum of 695 to 710 nm.

Thus, all conventional polymethine dyes containing a propylene crosslinking structure attached to the 2- and 4-positions on the methine chain are spectrally sensitized in M-band (Addition method: stored at a temperature of 40° C. for 20 minutes after addition of a methanol solution of such a dye).

The inventor made an extensive study to utilize J-band spectral sensitization to enhance sensitivity and storage stability. As a result, it was found that J-band spectral sensitization can be accomplished with a structure in which the 2'-position in the propylene crosslink attached to the 2- and 4-positions on the methine chain is mono-substituted. The inventor has already described such compounds in Japanese Patent Application Nos. 2-270161, 2-270162, and 2-270163 (corresponding to JP-A-4-146428, JP-A-4-146430, and JP-A-4-146431, respectively).

However, these conventional compounds occasionally give insufficient spectral sensitivity in certain wavelength ranges and leave much to be desired in storage stability.

SUMMARY OF THE INVENTION

It is therefore an object of the present invention to provide a silver halide photographic material which exhibits a high sensitivity and an excellent aging preservability.

It is another object of the present invention to provide a dye-containing silver halide photographic material which exhibits a high sensitivity and an excellent aging preservability.

These and other objects of the present invention will become more apparent from the following detailed description and examples.

These objects of the present invention are accomplished with a silver halide photographic material, which comprises at least one methine dye represented by the following formula (I):

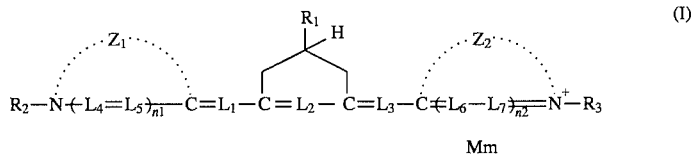

wherein $Z_1$ and $Z_2$ each represents an atomic group required for the formation of a 5- or 6-membered nitrogen-containing heterocyclic group; $R_1$ represents an alkyl, aryl or heterocyclic group; $R_2$ and $R_3$ each represents an alkyl group, with the proviso that at least one of $R_2$ and $R_3$ represents an alkyl group substituted by an alkoxy or aryloxy group; $L_1$, $L_2$, $L_3$, $L_4$, $L_5$, $L_6$, and $L_7$ each represents a methine group; which may be substituted or unsubstituted $n_1$ and $n_2$ each represents an integer 0 or 1; M represents a charge neutralizing ion; and m represents 0 or a higher number required for the neutralization of electric charge in the dye.

Figure 1:
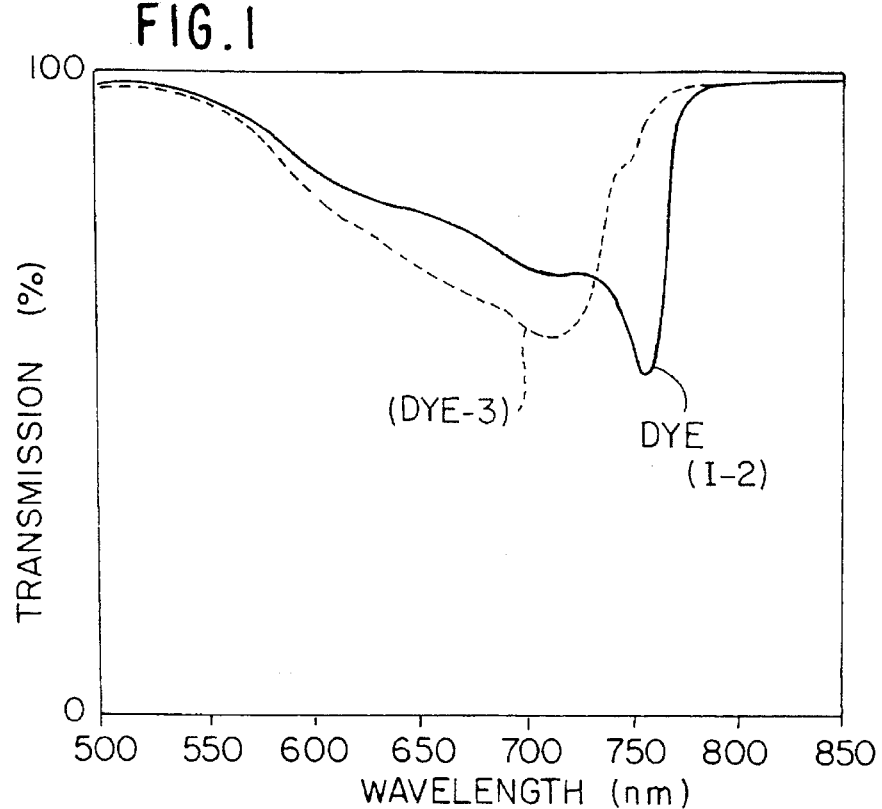
FIG. 1 shows the reflection absorption spectra of Sample No. 1 of Example 5 containing Dye (I-2) of the present invention (solid line) and Sample No. 6 of Example 5 containing Comparative Dye (Dye-3) (broken line)

In these graphs, the abscissa indicates a wavelength (nm), and the ordinate axis indicates a percent transmission (%).

DETAILED DESCRIPTION OF THE INVENTION

The present invention will be further described hereinafter.

Examples of the nucleus formed by $Z_1$ or $Z_2$ include a thiazole nucleus {for example, a thiazole nucleus (e.g., thiazole, 4-methylthiazole, 4-phenylthiazole 4,5-dimethylthiazole, 4,5-diphenylthiazole), a benzothiazole nucleus (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylthiobenzothiazole, 5,6-dimethoxybenzothiazole, 5-hydroxy-6-methylbenzothiazole, 5,6-dimethylthiobenzothiazole, 4-phenylbenzothiazole), a naphthothiazole nucleus (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 5-methoxynaphtho[2,3-d]thiazole, 8-methylthionaphtho[1,2-d]thiazole)}; a thiazoline nucleus (e.g., thiazoline, 4-methylthiazoline, 4-nitrothiazoline); an oxazole nucleus {for example, an oxazole nucleus (e.g., oxazole, 4-methyloxazole, 4-nitrooxazole, 5-methyloxazole, 4-phenyloxazole, 4,5-diphenyloxazole, 4-ethyloxazole), a benzoxazole nucleus (e.g., benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenz-oxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), a naphthoxazole nucleus (e.g., naphtho[2,1-d]oxazole, naphtho[1,2-d]oxazole, naphtho[2,3-d]oxazole, 5-nitronaphtho[2,1-d]oxazole)}; an oxazoline nucleus (e.g., 4,4-dimethyloxazoline); a selenazole nucleus {for example, a selenazole nucleus (e.g., 4-methylselenazole, 4-nitroselenazole, 4-phenylselenazole), a benzoselenazole nucleus (e.g., benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole), a naphthoselenazole nucleus (e.g., naphtho[2,1-d]selenazole, naphtho[1,2-d]selenazole)}; a selenazoline nucleus (e.g., selenazoline, 4-methylselenazoline); a quinoline nucleus (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline, 6-chloro-4-quinoline); and a tetrazole nucleus (e.g., 5,6-dimethylbenzotetrazole).

Preferred among these nuclei formed by $Z_1$ or $Z_2$ are a benzothiazole nucleus, a naphthothiazole nucleus, a benzoxazole nucleus, and a naphthoxazole nucleus.

$R_1$ represents an alkyl group having from 1 to 18 carbon atoms {for example, methyl, ethyl, propyl, isopropyl, allyl, butyl, isobutyl, hexyl, octyl, dodecyl and octadecyl which may be further substituted by substituents such as a carboxyl group, a sulfo group, a cyano group, a nitro group, a halogen atom, a hydroxyl group, an alkoxy group having from 1 to 8 carbon atoms (e.g., methoxy, ethoxy, benzyloxy, phenethyloxy), an aryloxy group having from 6 to 15 carbon atoms (e.g., phenoxy), an acyloxy group having from 1 to 8 carbon atoms (e.g., acetyloxy), an acyl group having from 1 to 8 carbon atoms, a sulfamoyl group, a carbamoyl group, and an aryl group having from 6 to 15 carbon atoms (e.g., phenyl, 4-methylphenyl, 4-chlorophenyl, α-naphthyl)}; an aryl group having from 6 to 18 carbon atoms {for example, phenyl, 2-naphthyl, and 1-naphthyl which may be further substituted by substituents such as a carboxyl group, a sulfo group, a cyano group, a nitro group, a halogen atom, a hydroxyl group, an alkyl group having from 1 to 8 carbon atoms (e.g., methyl, ethyl), an alkoxy group having from 1 to 8 carbon atoms (e.g., methoxy, ethoxy), an aryloxy group having from 6 to 15 carbon atoms (e.g., phenoxy), an acyloxy group having from 1 to 8 carbon atoms (e.g., acetyloxy), an acyl group having from 1 to 8 carbon atoms (e.g., acetyl), a sulfamoyl group, a carbamoyl group, and an aryl group having from 6 to 15 carbon atoms (e.g., phenyl)}; or a heterocyclic group having from 3 to 18 carbon atoms {for example, 2-pyridyl, 2-thiazolyl, and 2-furyl which may be further substituted (e.g., 4-methyl-2-pyridyl, 3-methyl-2-thiazolyl)}.

Preferred among these groups represented by $R_1$ are an unsubstituted alkyl group having from 1 to 6 carbon atoms (e.g., methyl, ethyl, propyl, butyl), and an unsubstituted aryl group having from 6 to 12 carbon atoms (e.g., phenyl, 1-naphthyl). Particularly preferred among these groups are a methyl group, an ethyl group, and a phenyl group.

$R_2$ and $R_3$ each independently represents an alkyl group having from 1 to 18 carbon atoms (e.g., methyl, ethyl, propyl, isopropyl, allyl, butyl, isobutyl, hexyl, octyl, dodecyl and octadecyl which may be further substituted by substituents such as those described with reference to the alkyl group represented by $R_1$). At least one of $R_2$ and $R_3$ is an alkyl group having from 1 to 18 carbon atoms substituted by an alkoxy group having from 1 to 8 carbon atoms or an aryloxy group having from 6 to 15 carbon atoms. Examples of such an alkoxy group include methoxy, ethoxy, benzyloxy, phenethyloxy, chloromethoxy and 2-methoxyethoxy. Examples of the aryloxy group include phenoxy, 1-naphthoxy, 2-naphthoxy, 4-methylphenoxy, 4-chlorophenoxy, and 4-hydroxyphenoxy.

At least one of $R_2$ and $R_3$ is preferably an alkyl group having from 1 to 6 carbon atoms substituted by an alkoxy group having from 1 to 4 carbon atoms. Preferred examples of such an alkoxy group include a methoxy group and an ethoxy group.

$L_1$, $L_2$, $L_3$, $L_4$, $L_5$, $L_6$, and $L_7$ each represents a methine group which may be substituted by substituents such as a substituted or unsubstituted alkyl group having from 1 to 18 carbon atoms (e.g., methyl, ethyl, 2-carboxyethyl), an aryl group having from 6 to 15 carbon atoms (e.g., phenyl), a halogen atom (e.g., chlorine), an alkoxy group having from 1 to 18 carbon atoms (e.g., methoxy, ethoxy) and amino group (e.g., N,N-diphenylamino, N-methyl-N-phenylamino, N-methylpiperadino). $L_1$, $L_2$, $L_3$, $L_4$, $L_5$, $L_6$, and $L_7$ may form a ring with other methine groups or may form a ring with $R_2$ or $R_3$.

Among these substituents, a methyl group, a phenyl group, and a methoxy group are preferred.

The substituents are preferably substituted at the positions on $L_1$, $L_2$, and $L_3$.

The suffixes $n_1$ and $n_2$ each represents an integer 0 or 1. Preferably, $n_1$ and $n_2$ are 0 at the same time.

M and m are included in formula (I) to indicate the presence or absence of cations or anions which are necessary for the neutralization of ionic charge in the dye. Whether a dye is a cation or anion or has a net ionic charge depends on its auxochromes and substituents.

Typical cations include an ammonium ion and an alkaline metal ion. On the other hand, the anion may be either an inorganic anion or an organic anion. Examples of such an anion include a halogen anion (e.g., fluorine ion, chlorine ion, bromine ion, iodine ion), a substituted arylsulfonic ion (e.g., p-toluenesulfonic ion, p-chlorobenzenesulfonic ion), an aryldisulfonic ion (e.g., 1,3-benzenedisulfonic ion, 1,5-naphthalenedisulfonic ion, 2,6-naphthalenedisulfonic ion), an alkylsulfuric ion (e.g., methylsulfuric ion), a sulfuric ion, a thiocyanic ion, a perchloric ion, a tetrafluoroboric ion, a picric ion, an acetic ion, and a trifluoromethanesulfonic ion. M may be two or more kinds of charge neutralizing ions.

Preferred among these anions are a perchloric ion, an iodine ion, a bromine ion, and a substituted arylsulfonic ion (e.g., p-toluenesulfonic ion).

Specific examples of the methine dye compound represented by formula (I) of the present invention are shown below, but the present invention should not be construed as being limited thereto:

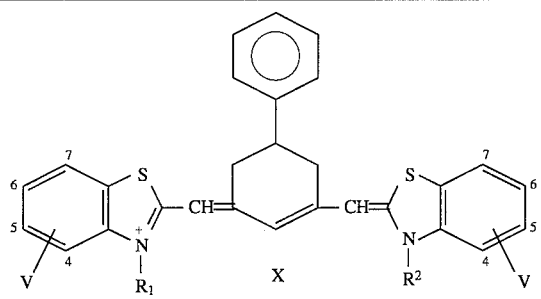

| Dye No. | $R_1$ | $R_2$ | V | X |
|---|---|---|---|---|
| I-1 | $-CH_2CH_2OCH_3$ | $-CH_2CH_2$ | H | $Br^-$ |
| I-2 | $-CH_2CH_2OCH_3$ | $-CH_2CH_2OCH_3$ | H | $I^-$ |
| I-3 | $-CH_2CH_2OCH_3$ | $-CH_2CH_2SO_3^-$ | H | — |
| I-4 | $-CH_2CH_2OPh$ | $-CH_2CH_3$ | H | $Br^-$ |
| I-5 | $-CH_2CH_2OPh$ | $-CH_2CH_2OPh$ | H | $CH_3\text{-}\langle\text{Ph}\rangle\text{-}SO_3^-$ |
| I-6 | $-CH_2CH_2OCH_2CH_3$ | $-CH_2CONHSO_2CH_3$ | H | $ClO_4^-$ |
| I-7 | $-CH_2CH_2OCH_3$ | $-CH_2CH_2CH_2OCH_3$ | 5-$OCH_3$ | $I^-$ |
| I-8 | $-CH_2CH_2OCH_3$ | $-CH_2CH_2OCH_3^-$ | 5-Cl | $I^-$ |
| I-9 | $-CH_2CH_2OCH_3$ | $-CH_2CH_2OCH_3$ | 4,5-benzo | $ClO_4^-$ |
| I-10 | $-CH_2CH_2O\text{-naphthyl}$ | $-CH_2CH_3$ | H | I |
| I-11 | $-CH_2CH_2O\text{-naphthyl}$ | $-CH_2CH_2O\text{-naphthyl}$ | H | $I^-$ |
| I-12 | $-CH_2CH_2OCH_3$ | $-CH_2CH_2OCH_3$ | H | $CH_3\text{-}\langle\text{Ph}\rangle\text{-}SO_3^-$ |

| | | | | |
|---|---|---|---|---|
| I-13 | —CH$_2$CH$_2$CH$_2$OCH$_3$ | —CH$_2$CH$_2$COOH | H | I$^-$ |

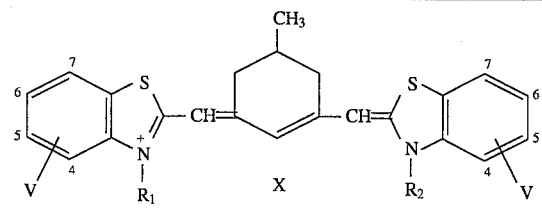

| Dye No. | R$_1$ | R$_2$ | V | X |
|---|---|---|---|---|
| II-1 | —CH$_2$CH$_2$OCH$_3$ | —CH$_2$CH$_3$ | H | Br$^-$ |
| II-2 | —CH$_2$CH$_2$OCH$_3$ | —CH$_2$CH$_2$OCH$_3$ | H | I$^-$ |
| II-3 | —CH$_2$CH$_2$OCH$_3$ | —CH$_2$CH$_2$OCH$_3$ | H | CH$_3$—C$_6$H$_4$—SO$_3^-$ |
| II-4 | —CH$_2$CH$_2$OPh | —CH$_2$CH$_2$OPh | H | I$^-$ |
| II-5 | —CH$_2$CH$_2$O-naphthyl | —CH$_2$CH$_2$O-naphthyl | H | ClO$_4^-$ |
| II-6 | —CH$_2$CH$_2$O-C$_6$H$_4$-SO$_3^-$ | —CH$_2$CH$_2$O-C$_6$H$_4$-SO$_3^-$ | H | Na$^+$ |
| II-7 | —CH$_2$CH$_2$O-C$_6$H$_4$-OH | —CH$_2$CH$_3$ | H | I$^-$ |
| II-8 | —CH$_2$CH$_2$OCH$_3$ | —CH$_2$CH$_3$ | 5-Cl | I$^-$ |
| II-9 | —CH$_2$CH$_2$OCH$_3$ | —CH$_2$CH$_2$OCH$_3$ | 4-OCH$_3$ | I$^-$ |
| II-10 | —CH$_2$CH$_2$OCH$_2$OCH$_3$ | —CH$_2$CH$_3$ | 4,5-benzo | I$^-$ |
| II-11 | —CH$_2$CH$_2$OCH$_2$CH$_3$ | —CH$_2$CH$_2$COOH | 5-Cl | I$^-$ |

(III-1)

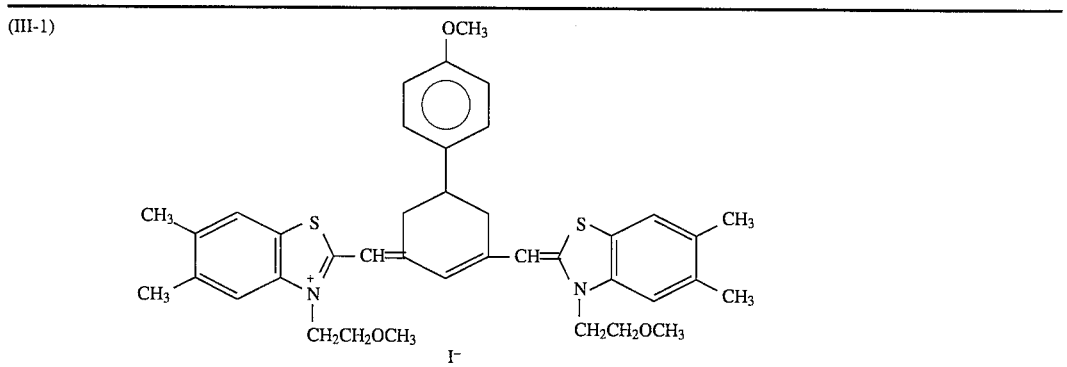

(III-2)

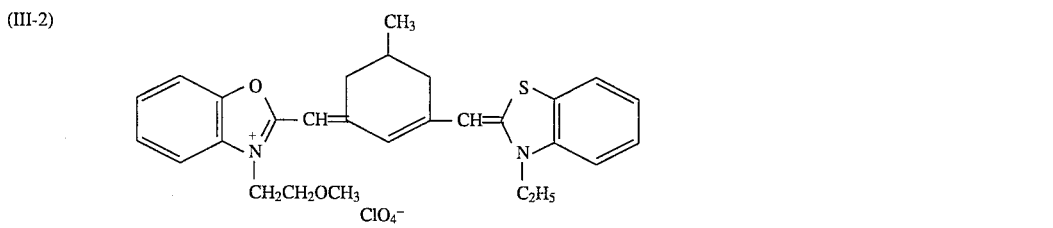

(III-3) 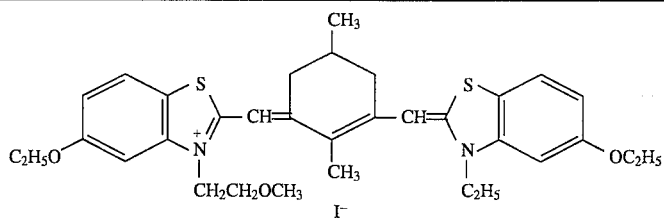
(III-4) 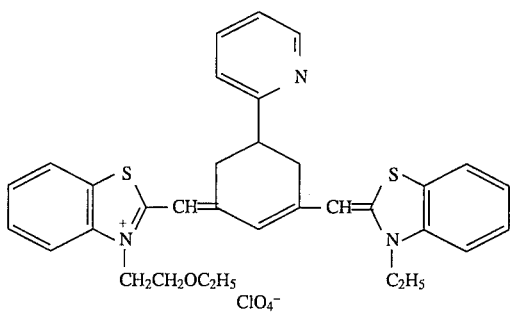
(IV-1) 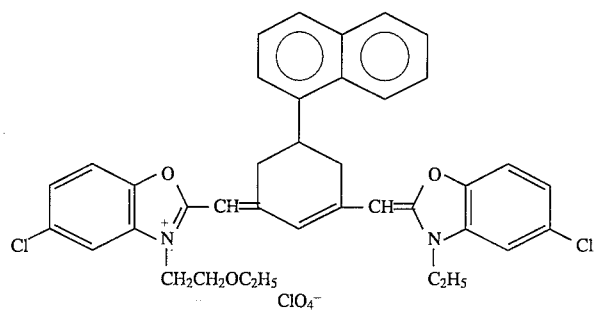
(IV-2) 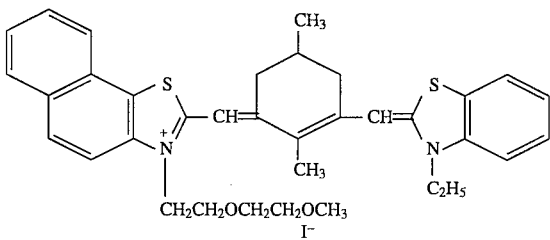
(IV-3) 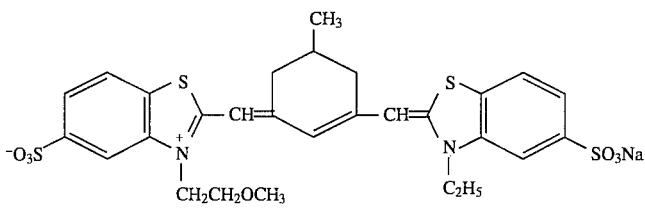
(IV-4) 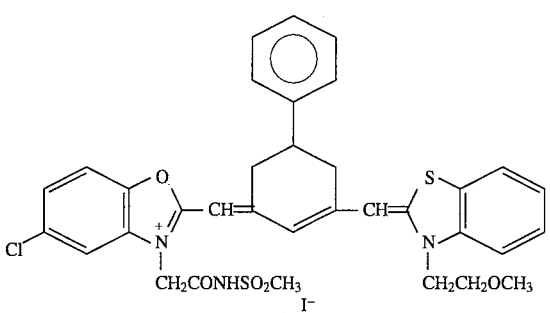

The methine dyes represented by formula (I) of the present invention can be synthesized by the methods described in the following references:

a) F. M. Hamer, *Heterocyclic Compounds-Cyanine Dyes and Related Compounds*, (John Wiley & Sons, New York, London, 1964), b) D. M. Sturmer, *Heterocyclic Compounds-Special Topics in Heterocyclic Chemistry*, Chapter 8, Section 4, pp. 482–515 (John Wiley & Sons, New York, London, 1977).

c) *Zh. Org. Khim.*, vol. 17, No. 1, pp. 167–169 (1981), vol. 15, No. 2, pp. 400–407 (1979), vol. 14, No. 10, pp. 2,214–2,221 (1978), vol. 13, No. 11pp. 2,440–2,443 (1977), vol. 19, No. 10, pp. 2,134–2,142 (1983), *Ukr. Khim. Zh.*, vol. 40, No. 6, pp. 625–629 (1974), *Khim. Geterotsikl. Soedin.*, No. 2, pp. 175–178 (1976), Russian Patents 420,643 and 341,823, JP-A-59-217761, U.S. Pat. Nos. 4,334,000, 3,671,648, 3,623,881 and 3,573,921, European Patent Disclosures 288,261A1 and 102,781A2, and JP-B-48-46930.

The time during which the sensitizing dye represented by formula (I) of the present invention is added to the silver halide emulsion of the present invention may be at any step in the preparation of the emulsion which has been heretofore considered suitable. For example, the sensitizing dye may be added to the system during the step of forming of silver halide grains and/or before the desalting step, or during the desalting step and/or during the period after the desalting step and before the beginning of chemical ripening as disclosed in U.S. Pat. Nos. 2,735,766, 3,628,960, 4,183,756 and 4,225,666, JP-A-58-184142, and JP-A-60-196749. Alternatively, the sensitizing dye may be added to the system shortly before or during the chemical ripening or during the period after chemical ripening and before coating of the emulsion as disclosed in JP-A-58-113920. Further, as disclosed in U.S. Pat. No. 4,225,666 and JP-A-58-7629, the sensitizing dye compound of the present invention may be added separately to the system singly or in combination with compounds having different kinds of structures batchwise during the step of forming the grains and during or after chemical ripening, or separately before or during chemical ripening and after chemical ripening. The compounds to be batchwise added and the combination of compounds to be added may be altered properly.

The amount of the spectral sensitizing dye represented by formula (I) of the present invention depends on the shape and size of silver halide grains. In general, the spectral sensitizing dye represented by formula (I) of the present invention can be used in an amount of $4\times10^{-6}$ to $8\times10^{-3}$ mol per mol of silver halide. For example, if the size of silver halide grains is in the range of 0.2 to 1.3 µm, the amount of the spectral sensitizing dye to be added is preferably in the range of $4.1\times10^{-6}$ to $3.5\times10^{-3}$ mol, more preferably $7.5\times10^{-6}$ to $1.5\times10^{-3}$ mol, per mol of silver halide.

The sensitizing dye to be used in the present invention can be directly dispersed in the emulsion. Alternatively, the sensitizing dye to be used in the present invention may be incorporated into the emulsion in the form of a solution in a proper solvent such as methyl alcohol, ethyl alcohol, methyl cellosolve, acetone, water, pyridine and mixtures thereof. In this case, additives such as base, acid and surface active agents may be present in the system. Further, ultrasonic wave can be used to dissolve the sensitizing dye in the solvent. Examples of the method for the addition of the sensitizing dye include a method which comprises dissolving a dye in a volatile organic solvent, dispersing the solution in a hydrophilic colloid, and then adding the dispersion to an emulsion as described in U.S. Pat. No. 3,469,987; a method which comprises dispersing a water-insoluble dye in a water-soluble solvent without dissoluting, and then adding the dispersion to an emulsion as described in JP-B-46-24185; a method which comprises dissolving a dye in a surface active agent, and then adding the solution to an emulsion as described in U.S. Pat. No. 3,822,135, a method which comprises dissolving a dye with a red-shifting compound, and then adding the solution to an emulsion as described in JP-A-51-74624; and a method which comprises dissolving a dye in an acid substantially free of water, and then adding the solution to an emulsion as described in JP-A-50-80826. Besides these methods, those described in U.S. Pat. Nos. 2,912,343, 3,342,605, 2,996,287, and 3,429,835 can be used to add a dye to an emulsion.

The methine dye of the present invention can be used as a filter dye, an anti-irradiation dye, or an anti-halation dye for the purpose of enhancing sharpness and color separability.

The methine dye of the present invention can be incorporated into a coating solution such as a silver halide photographic material layer, or a filter layer and/or an anti-halation layer by any commonly used method. The amount of the methine dye of the present invention may be such that it is enough to color the photographic layer. Those skilled in the art can properly select the amount of the methine dye depending on the purpose. In general, the amount of the methine dye of the present invention preferably selected such that the optical density of the photographic material is in the range of 0.05 to 3.0.

The time during which the methine dye of the present invention is added may be at any step before coating.

Further, a polymer having an electric charge opposite the dye ion may be present in the layer as a mordant so that it interacts with the dye molecule to localize the dye in certain layers.

Examples of such a polymer mordant include those described in U.S. Pat. Nos. 2,548,564, 4,124,386, 3,625,694, 3,958,995, 4,168,976, and 3,445,231.

Examples of supersensitizers useful in the spectral sensitization of the methine dye of the present invention include a pyrimidylamino compound, a triazinylamino compound, and an azolium compound described in U.S. Pat. Nos. 3,511,664, 3,615,613, 3,615,632, 3,615,641, 4,596,767, 4,945,038, 4,965,182, and 5,061,618. With reference to its usage, those uses described in the above cited patents are preferred.

The silver halide which can be incorporated into the silver halide photographic material of the present invention may be silver bromide, silver bromoiodide, silver bromochloroiodide, silver bromochloride or silver chloride. A preferred silver halide is silver bromide, silver bromochloride, silver bromochloroiodide or highly chlorinated silver described in JP-A-2-42.

The configuration and processing method of the photographic material will be described hereinafter. The configuration and processing method described in JP-A-2-42 can be preferably used, particularly for highly chlorinated silver.

The configuration and processing method described in JP-A-63-264743 can be preferably used, particularly for silver bromochloride.

The silver halide grains in the photographic material may have a regular crystal form such as cube, tetradecahedron and rhombic dodecahedron, an irregular crystal form such as sphere and tablet, or composites thereof. The silver halide grains of the present invention may be a mixture of grains having various crystal forms.

The silver halide grains of the present invention may differ in phase from core to surface layer or may have a uniform phase. The silver halide grains of the present invention may be grains which form a latent image mainly on the surface thereof (e.g., negative type photographic material) or grains which form a latent image mainly inside thereof (e.g., internal latent type photographic material) or grains which have previously been fogged (e.g., direct positive type photographic material).

Silver halide grains having the above-mentioned halogen compositions, crystal habits, inner structure, shape and distribution can be incorporated into photographic materials (elements) for various applications.

The methine dye of the present invention can be incorporated into photographic materials for applications as a sensitizer, sensitizing dye or filter, or for the purpose of inhibiting halation or irradiation. These dyes may be incorporated into any desired layer such as an interlayer, a protective layer and a back layer besides the light-sensitive emulsion layer.

The methine dye of the present invention can be incorporated into various color and black-and-white silver halide photographic materials.

More particularly, the methine dye of the present invention may be incorporated into photographic materials for color positive, photographic materials for color paper, photographic materials for color negative, photographic materials for color reversal (optionally containing couplers), silver halide photographic materials for direct positive, photographic materials for plate making (e.g., lith film, lith duplicating film), photographic materials for cathode ray tube display, photographic materials for X-ray recording (particularly photographic materials for direct and indirect picture taking using a screen), photographic materials for use in a silver salt diffusion transfer process, photographic materials for use in a color diffusion transfer process, photographic materials for use in a dye transfer process (inhibition process), light-sensitive materials for use in a silver dye bleaching process, and photographic materials for use in heat development.

The preparation of the silver halide photographic emulsion to be used in the present invention can be accomplished by any suitable method as described in P. Glafkides, *Chimie et Physique Photographique* (Paul Montel, 1967), G. F. Duffin, *Photographic Emulsion Chemistry* (The Focal Press, 1966), and V. L. Zelikman et al., *Making and Coating Photographic Emulsion* (The Focal Press, 1964).

In order to control the growth of silver halide grains during the formation thereof, a silver halide solvent can be used, such as ammonia, potassium thiocyanate, ammonium thiocyanate, a thioether compound (described in U.S. Pat. Nos. 3,271,157, 3,574,628, 3,704,130, 4,297,439, and 4,276,374), a thione compound (described in JP-A-53-144319, JP-A-53-82408, and JP-A-5-77737), and an amine compound (described in JP-A-54-00717).

In the process of formation or physical ripening of silver halide grains, cadmium salt, zinc salt, thallium salt, iridium salt or a complex salt thereof, rhodium salt or a complex salt thereof, and iron salt or a complex salt thereof may be present in the system.

Examples of the internal latent image type silver halide emulsion to be used in the present invention include conversion type silver halide emulsions, core/shell type silver halide emulsions and silver halide emulsions having different kinds of metals incorporated therein described in U.S. Pat. Nos. 2,592,250, 3,206,313, 3,447,927, 3,761,276, and 3,935,014.

The silver halide emulsion to be used in the present invention is normally subjected to chemical sensitization. For chemical sensitization, methods as described in H. Frieser, *Die Grundlagen der Photographischen Prozesse mit Silberhalgeniden*, pp. 675–734 (Akademische Verlags Gesellschaft, 1968) can be used.

Specifically, sulfur sensitization method using a sulfur-containing compound capable of reacting with an active gelatin or silver (e.g., thiosulfate, thiourea, mercapto compound, rhodanine); selenium sensitization method; reduction sensitization method using a reducing substance (e.g., stannous salt, amine, hydrazine derivative, formamidinesulfinic acid, silane compound); and noble metal sensitization method using a noble metal (e.g., gold complex, complex salt of the group VIII metals such as Pt, Ir and Pd) may be used singly or in combination.

The photographic material to be used in the present invention may have various compounds incorporated therein for the purpose of inhibiting fog during the preparation, storage or photographic processing of the photographic material or for the purpose of stabilizing the photographic properties. Specifically, there can be incorporated into the photographic material many compounds known as fog inhibitors or stabilizers such as azoles (e.g., benzothiazolium salts described in U.S. Pat. Nos. 3,954,478 and 4,942,721 and JP-A-59-191032, ring-opened compounds thereof, nitroindazoles, triazoles, benzotriazoles, and benzimidazoles (particularly nitro- or halogen-substituted benzimidazoles) described in JP-B-59-26731); heterocyclic mercapto compounds (e.g., mercaptothiazoles, mercaptobenzothiazoles, mercaptobenzimidazoles mercaptothiadiazoles, mercaptotetrazoles (particularly 1-phenyl-5-mercaptotetrazole), mercaptopyrimidines); the above-mentioned heterocyclic mercapto compounds substituted by a water-soluble group such as a carboxyl group and a sulfone group; thioketone compounds (e.g., oxazolinethioketone); azaindenes (e.g., tetrazaindenes (particularly 4-hydroxy-substituted (1,3,3a,7)tetrazaindenes)); benzenethiosulfonic acids; benzenesulfinic acids; and acetylene compounds described in JP-A-62-87957.

The silver halide photographic material of the present invention may contain color couplers such as a cyan coupler, a magenta coupler and a yellow coupler, and a compound which disperses a coupler.

Specifically, the silver halide photographic material of the present invention may contain compounds which are capable of coloring by oxidative coupling with an aromatic primary amine developing agent (e.g., phenylenediamine derivative, aminophenol derivative) during color development. Examples of such a magenta coupler include a 5-pyrazolone coupler, a pyrazolobenzimidazole coupler, a cyanoacetyl coumarone coupler, and an open chain acylacetonitrile coupler. Examples of the yellow coupler include an acylacetamide coupler (e.g., benzoylacetanilides, pivaloylacetanilides). Examples of the cyan coupler include a naphthol coupler and a phenol coupler. These couplers are preferably nondiffusive, that is, they preferably contain a hydrophobic group called a ballast group in their molecule. These couplers may be either two-equivalents or four-equivalents to silver ion. These couplers may be colored couplers having a color correcting effect or couplers which release a development inhibitor upon development (so-called DIR couplers).

The silver halide photographic material of the present invention may contain a noncolor DIR coupling compound which undergoes a coupling reaction to give a colorless product and release a development inhibitor besides such a DIR coupler.

The photographic material of the present invention may contain polyalkylene oxides or their derivatives such as ether, ester and amine, thioether compounds, thiomorpholines, quaternary ammonium chloride compounds, urethane derivatives, urea derivatives, imidazole derivatives, and 3-pyrazolidones for the purpose of increasing sensitivity and contrast or accelerating development.

The silver halide photographic material of the present invention may contain various dyes other than the compounds represented by formula (I) of the present invention as filter dyes or for the purpose of inhibiting irradiation or for other purposes.

Examples of such dyes include oxonol dyes having a pyrazolone nucleus or a barbituric acid nucleus described in British Patents 506,385, 1,177,429, 1,311,884, 1,338,799, 1,385,371, 1,467,214, 1,433,102 and 1,553,516, JP-A-48-85130, JP-A-49-114420, JP-A-52-117123, JP-A-55-161233, JP-A-59-111640, JP-B-39-22069, JP-B-43-13168, JP-B-62-273527, and U.S. Pat. Nos. 3,247,127, 3,469,985 and 4,078,933; other oxonol dyes described in U.S. Pat. Nos. 2,533,472 and 3,379,533, British Patent 1,278,621, JP-A-1-134447, and JP-A-1-183652; azo dyes described in British Patents 575,691, 680,631, 599,623, 786,907, 907,125 and 1,045,609, U.S. Pat. No. 4,255,326, and JP-A-59-211043; azomethine dyes described in JP-A-50-100116, JP-A-54-118247, and British Patents 2,014,598 and 750,031; anthraquinone dyes described in U.S. Pat. No. 2,865,752; arylidene dyes described in U.S. Pat. Nos. 2,533,009, 2,688, 541 and 2,538,008, British Patents 584,609 and 1,210,252, JP-A-50-40625, JP-A-51-3623, JP-A-51-10927, JP-A-54-118247, JP-B-48-3286, and JP-B-59-37303; styryl dyes described in JP-B-28-3082, JP-B-44-16594, and JP-B-59-28898; triarylmethane dyes described in British Patents 446,583 and 1,335,422, and JP-A-59-228250; melocyanine dyes described in British Patents 1,075,653, 1,153,341, 1,284,730, 1,475,228 and 1,542,807; and cyanine dyes described in U.S. Pat. Nos. 2,843,486 and 3,294,539, and JP-A-1-291247.

In order to inhibit the diffusion of these dyes, the following methods may be used.

For example, U.S. Pat. Nos. 2,548,564, 4,124,386, and 3,625,694 disclose a method where a hydrophilic polymer having an electric charge opposite that of a dissociated anionic dye is allowed to be present in a layer as a mordant so that it interacts with dye molecules to localize the dye in certain layers.

Further, a method where certain layers are dyed with a water-insoluble dye solid is disclosed in JP-A-56-12639, JP-A-55-155350, JP-A-55-155351, JP-A-63-27838, JP-A-63-197943, and European Patent 15,601.

Moreover, a method where certain layers are dyed with finely divided metal salt grains having a dye adsorbed thereto is disclosed in U.S. Pat. Nos. 2,719,088, 2,496,841 and 2,496,843, and JP-A-60-45237.

The photographic material of the present invention may contain various surface active agents for various purposes, e.g., aiding coating and emulsion dispersion, inhibiting static and adhesion, and improving smoothness and photographic properties (e.g., acceleration of development, hard gradation, sensitization).

In the implementation of the present invention, other additives may be used in combination with the silver halide emulsion or other hydrophilic colloids. Examples of such additives include a discoloration inhibitor, an inorganic or organic film hardener, a color fog inhibitor, an ultraviolet absorbent, a mordant, a plasticizer, a latex polymer, and a matting agent. Specific examples of such additives are described in *Research Disclosure*, vol. 176, RD-17643 (December, 1978).

The photographic material of the present invention comprises a hydrophilic polymer (e.g., gelatin) as a protective colloid.

Finished silver halide emulsions and the like are coated on a proper support such as baryta paper, resin-coated paper, synthetic paper, triacetate film, polyethylene terephthalate film, other plastic bases, and glass plate.

The exposure by which a photographic image is obtained may be conducted in a commonly known manner. Specifically, any of the many known light sources such as natural light (sunshine), tungsten lamp, fluorescent tube, mercury vapor lamp, xenon arc lamp, carbon arc lamp, xenon flash lamp and cathode ray tube flying spot may be used. The exposure time may range from $\frac{1}{1000}$ second to one second to be used in a usual camera as well as from less than $\frac{1}{1000}$ second (e.g., $\frac{1}{10}^4$ to $\frac{1}{10}^6$ second obtained by xenon flash lamp or cathode ray tube) to more than one second. If necessary, a color filter can be used to adjust the spectral composition of the light to be used for exposure. Laser can be used for exposure. Further, exposure can be conducted with light emitted by a fluorescent material excited by electron rays, X-ray, γ-ray, or α-ray.

For the photographic processing of the light-sensitive material prepared according to the present invention, any processing method and processing solution described in *Research Disclosure*, vol. 176, pp. 28–30, RD-17643 (December, 1978) can be applied. This photographic processing may be either one for the formation of silver image (black-and-white photographic processing) or one for the formation of color image (color photographic processing) depending on the purpose. The processing temperature is normally selected from a temperature in the range from 18° C. to 50° C. However, the processing temperature may fall below 18° C. or exceed 50° C.

The present invention will be further described in the following examples, but the present invention should not be construed as being limited thereto.

The terms "λmax", "ε", and "m p." as used in the following examples mean an "absorption maximum in methanol", an "absorbance coefficient", and a "melting point", respectively.

EXAMPLE 1

Synthesis of Dye (I-2)

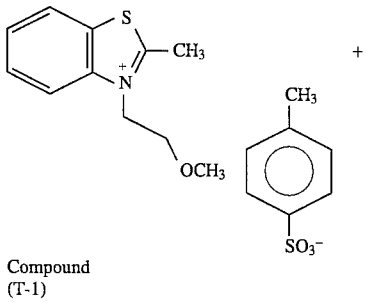

Compound (T-1)

-continued

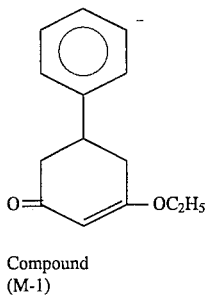

Compound
(M-1)

6.0 g of Compound (T-1) and 2.0 g of Compound (M-1) were heated to a temperature of 160° C. with stirring for 10 hours. After being cooled, the reaction solution was purified through silica gel chromatography (eluant: mixture of dichloromethylene and methanol) to obtain 1.6 g of Dye (I-12) which is a p-toluenesulfonate of Dye (I-2) of the desired compound.

1.6 g of Dye (I-12) was completely dissolved in 50 ml of methanol. To the solution was then added 30 ml of a methanol solution of 1.5 g of sodium iodide with stirring at room temperature. The resulting crystal was withdrawn by filtration, washed with 20 ml of methanol, and then dried to obtain 1.4 g of Dye (I-2) of the desired compound.

Dye (I-12)
Yield: 27%
$\lambda_{max}$=649.9 nm (MeOH)
$\epsilon$=1.72×10$^5$
m.p.=149° C.

Dye (I-2)
Yield: 22%
$\lambda_{max}$=649.9 nm (MeOH)
$\epsilon$=1.74×10$^5$
m.p.=186° C.

EXAMPLE 2

Synthesis of Dye (I-5)

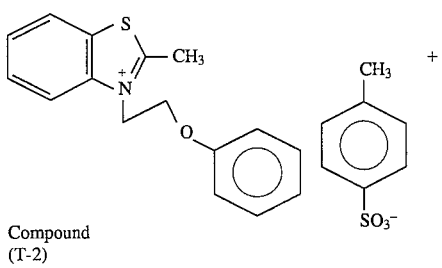

Compound
(T-2)

1.0 g of Dye (I-5) of the desired compound was prepared from 6.0 g of Compound (T-2) and 2.0 g of Compound (M-1) in the same manner as in Example 1.

Dye (I-5)
Yield: 17%
$\lambda_{max}$=651.8 nm (MeOH)
$\epsilon$=1.78×10$^5$
m.p.=202° C.

EXAMPLE 3

Synthesis of Dye (I-11).

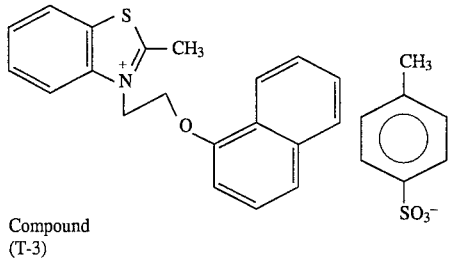

Compound
(T-3)

1.20 g of Dye (I-11) of the desired compound was prepared from 5.0 g of Compound (T-3) and 1.25 g of Compound (M-1) in the same manner as in Example 1.

Dye (I-11)
Yield: 26%
$\lambda_{max}$=654.4 nm (MeOH)
$\epsilon$=1.51×10$^5$
m.p.=188° C.

EXAMPLE 4

Synthesis of Dye (II-2)

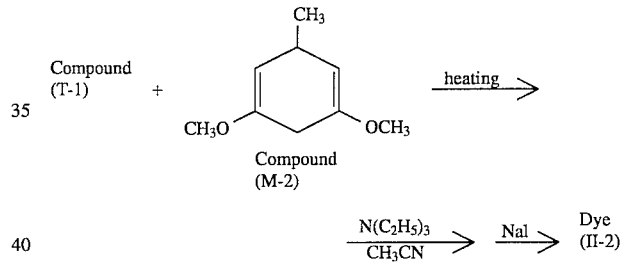

3.0 g of Compound (T-1) and 0.8 g of Compound (M-2) were heated to a temperature of 140° C. with stirring for 1 hour. After being cooled, the reaction solution was heated under reflux with 10 ml of acetonitrile and 1.0 ml of triethylamine for 1 hour. After being cooled, 50 ml of a methanol solution of 2.0 g of sodium iodide was added to the reaction solution. The resulting crystal was withdrawn by filtration.

The crude crystal thus obtained was dissolved in a mixture of dichloromethane and methanol. The solvent was distilled off under reduced pressure to effect recrystallization to obtain 1.70 g of Dye (II-2) of the desired compound.

Dye (II-2)
Yield: 53%
$\lambda_{max}$=645.5 nm (MeOH)
$\epsilon$=1.83×10$^5$
m.p.=242° C.

EXAMPLE 5

To a 3% aqueous solution of lime-treated gelatin was added 3.3 g of sodium chloride. To the material was then added 3.2 ml of a 1% aqueous solution of N,N'-dimethylimidazolidine-2-thion. To the aqueous solution were then added an aqueous solution containing 0.2 mol of silver nitrate and an aqueous solution containing 15 μg of rhodium trichloride and 0.2 mol of sodium chloride at a temperature of 56° C. with vigorous stirring. To the material were then added an aqueous solution containing 0.780 mol of silver nitrate and an aqueous solution containing 0.780 mol of sodium chloride and 4.2 mg of potassium ferrocyanide at a temperature of 56° C. with vigorous stirring. Five minutes after the completion of the addition of the aqueous solution of silver nitrate and the aqueous solution of sodium chloride, an aqueous solution containing 0.020 mol of silver nitrate and an aqueous solution containing 0.015 mol of potassium bromide, 0.005 mol of sodium chloride and 0.8 mg of potassium hexachloroiridiumate (IV) were then added to the material at a temperature of 40° C. with vigorous stirring. To the material was then added a high molecular flocculating agent to effect sedimentation. The precipitate was desalted and washed with water.

The emulsion was then ripened with 90.0 g of lime-treated gelatin and triethylthiourea at a temperature of 55° C. for optimum chemical sensitization.

All the silver bromochloride grains in the emulsion thus obtained were cubic grains having an average grain size of 0.52 μm (fluctuation coefficient: 0.08). The grain size is represented by the diameter as calculated in terms of projected area. The fluctuation coefficient is obtained by dividing the standard deviation of grain sizes by the average grain size.

X-ray diffraction of the silver halide crystal was then measured to determine the halogen composition of the emulsion grain.

With a monochromatic $CuK(\alpha)$ ray as a radiation source, the angle of diffraction from (200) plane was specifically measured. The diffraction light from a crystal having a uniform halogen composition gives a single peak, whereas the diffraction light from a crystal having localized phases with different halogen compositions gives a plurality of patterns corresponding to the halogen compositions. The lattice constant can be calculated from the diffraction angle of the measured peaks to determine the halogen composition of the silver halides constituting the crystal.

In the measurement of the silver bromochloride emulsion thus prepared, a broad diffraction pattern having a main peak corresponding to 100 mol % silver chloride and a peak centering around 70 mol % silver chloride (30 mol % silver bromide) with its foot in the vicinity of 60 mol % silver chloride (40 mol % silver bromide) could be observed.

Using the emulsion thus obtained, the layer components described later were coated on a polyethylene double-laminated paper to prepare a multi-layer color photographic paper. The various coating solutions used were prepared as follows:

Preparation of 1st layer coating solution

To 19.1 g of a yellow coupler (Ex-Y), 4.4 g of a dye stabilizer (Cpd-1) and 1.4 g of a dye stabilizer (Cpd-7) were added 27.2 ml of ethyl acetate and 8.2 g of a solvent (Solv-1) to prepare a solution. The solution thus obtained was then emulsion-dispersed in 185 ml of a 10% aqueous solution of gelatin containing 8 ml of a 10% aqueous solution of dodecylbenzenesulfonic acid. To the previously prepared silver bromochloride emulsion were added sensitizing dyes (Dye-1) and (Dye-2) described below in admixture at a temperature of 40° C. After 30 minutes, to the material was added the above mentioned emulsion dispersion in admixture to make dissolution. Thus, a coating solution for the first layer having the composition mentioned below was prepared.

The coating solutions for the second to seventh layers were prepared in the same manner as the first layer coating solution.

However, only the preparation of the silver bromochloride emulsion for the third layer was different. Specifically, the ripening with lime-treated gelatin and triethylthiourea was preceded by the following treatments. Sensitizing Dyes of the present invention (I-2), (I-5), (I-11), (II-2), and (II-4) or Comparative Dyes (Dye-3), (Dye-4), and (Dye-5) described in U.S. Pat. No. 2,481,022 were added to the system with vigorous stirring in an amount of $2.0 \times 10^{-4}$ per mol of silver halide mol at a temperature of 70° C. After 30 minutes, the temperature of the emulsion was lowered to 55° C. The gelatin hardener for each layer was a sodium salt of 2-hydroxy-4,6-dichloro-1,3,5-triazine.

The spectral sensitizing dyes for each layer were the following compounds:

First layer: yellow color layer
(Dye-1)

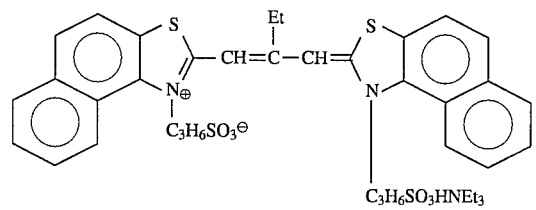

$(0.84 \times 10^{-5}$ mol per mol of silver halide)
(Dye-2)

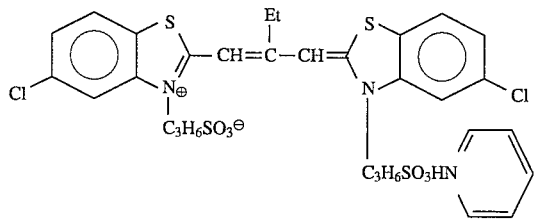

$(0.56 \times 10^{-5}$ mol per mol of silver halide)
Third layer: magenta color layer
Sensitizing Dyes: (I-2), (I-5), (I-11), (II-2), (II-4)
Comparative Dyes (described in U.S. Pat. No. 2,481,022):
(Dye-3)

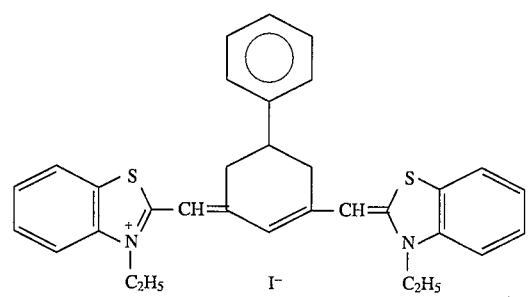

(Dye-4)

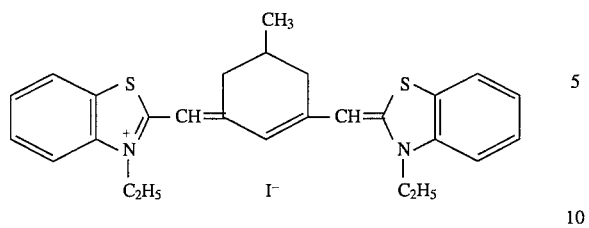

(Dye-5)

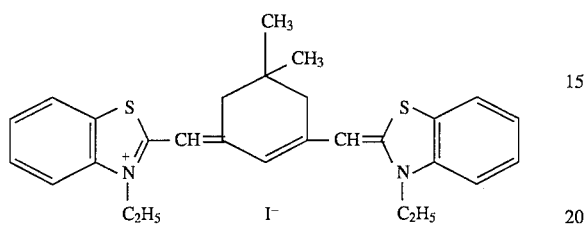

Fifth layer: cyan color layer
(Dye-6)

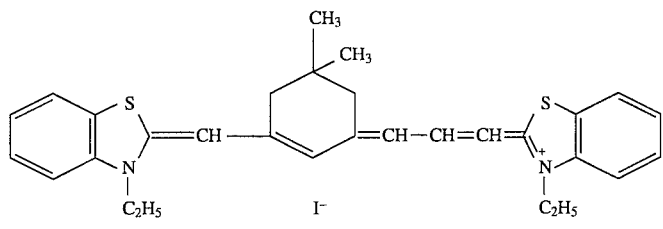

($6.5 \times 10^{-6}$ mol per mol of silver halide)

To each of these color layers was added 1-(5-methylureidophenyl)-5-mercaptotetrazole in an amount of $6.0 \times 10^{-4}$ mol per mol of silver halide.

For the purpose of inhibiting irradiation, to the emulsion layer were added disodium 2-(3-(2-hydroxyethylcarbamoyl)- 4-(5-(5-hydroxy-3-(2-hydroxy-ethylcarbamoyl)-1-(2-sulfobenzyl)-5-pyrazolyl)-2,4-pentadienylidene)-5-pyrazolone-1-ilmethyl)benzenesulfonate, tripotassium 4-(3,3-dimethyl-5-sulfo-2-(7-((3,3-dimethyl-5-sulfo-1-(4-sulfobutyl)indoline-2-ilidene-1,3,5-heptatrienyl)-3H-1-indolio)butanesulfonate, and pentapotassium 4-(3,3-dimethyl-4,6-di-sulfo-2-(7-((3,3-dimethyl-4,6-disulfo-1-(4-sulfobutyl)benzo[e]indoline-2-ilidene)-1,2,5-heptatrienyl)-3H-1benzo[e]indolio)butanesulfonate, as dyes.

(Constituent layers)

The composition of the various layers is given below. The figure indicates coated amount (g/m$^2$). The coated amount of silver halide emulsion is represented as calculated in terms of silver.

Support

Polyethylene-laminated paper [containing a white pigment (TiO$_2$) and a bluish dye (ultramarine) in the polyethylene on the first layer side]

| First layer: red-sensitive yellow color layer | |
|---|---|
| Silver bromochloride emulsion as mentioned above | 0.30 as Ag |
| Gelatin | 1.86 |
| Yellow coupler (Ex-Y) | 0.82 |
| Dye stabilizer (Cpd-1) | 0.19 |
| Dye stabilizer (Cpd-7) | 0.06 |
| Solvent (Solv-1) | 0.35 |

| Second layer: color stain-inhibiting layer | |
|---|---|
| Gelatin | 0.99 |
| Color stain inhibitor (Cpd-5) | 0.08 |
| Solvent (Solv-1) | 0.16 |
| Solvent (Solv-4) | 0.08 |

| Third layer: infrared-sensitive magenta color layer | |
|---|---|
| Silver bromochloride emulsion as mentioned above | 0.12 as Ag |
| Gelatin | 1.24 |
| Magenta coupler (Ex-M) | 0.20 |
| Dye stabilizer (Cpd-2) | 0.03 |
| Dye stabilizer (Cpd-3) | 0.15 |
| Dye stabilizer (Cpd-4) | 0.02 |
| Dye stabilizer (Cpd-9) | 0.02 |
| Solvent (Solv-2) | 0.40 |

| Fourth layer: ultraviolet absorbing layer | |
|---|---|
| Gelatin | 1.58 |
| Ultraviolet absorbent (UV-1) | 0.47 |
| Color stain inhibitor (Cpd-5) | 0.05 |
| Solvent (Solv-5) | 0.24 |

| Fifth layer: infrared-sensitive cyan color layer | |
|---|---|
| Silver bromochloride emulsion as mentioned above | 0.23 as Ag |
| Gelatin | 1.34 |
| Cyan coupler (Ex-C) | 0.32 |
| Dye stabilizer (Cpd-6) | 0.17 |
| Dye stabilizer (Cpd-7) | 0.40 |
| Dye stabilizer (Cpd-8) | 0.04 |
| Solvent (Solv-6) | 0.15 |

| Sixth layer: ultraviolet absorbing layer | |
|---|---|
| Gelatin | 0.53 |
| Ultraviolet absorbent (UV-1) | 0.16 |
| Color stain inhibitor (Cpd-5) | 0.02 |
| Solvent (Solv-5) | 0.08 |

| Seventh layer: protective layer | |
|---|---|
| Gelatin | 1.33 |
| Modified copolymer of polyvinyl alcohol (modification degree: 17%) | 0.17 |
| Liquid paraffin | 0.03 |

Yellow coupler (ExY)

1:1 mixture (molar ratio) of:

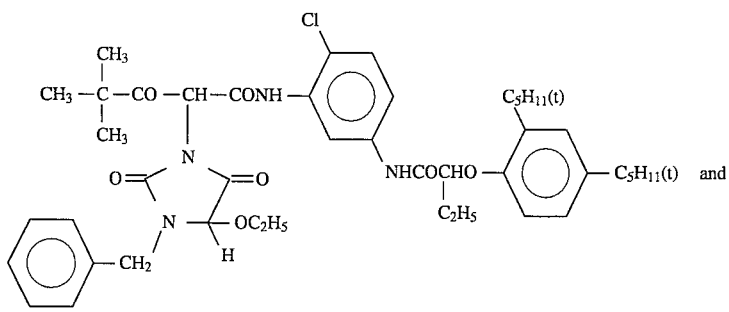

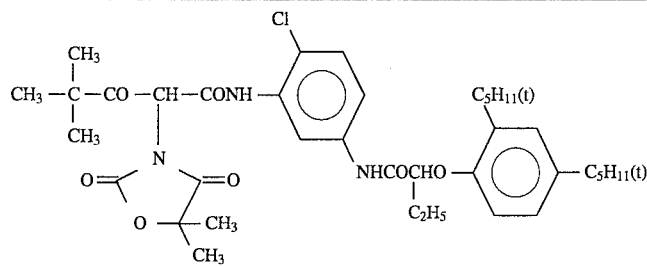
Magenta coupler (ExM)
1:1 mixture (molar ratio) of:
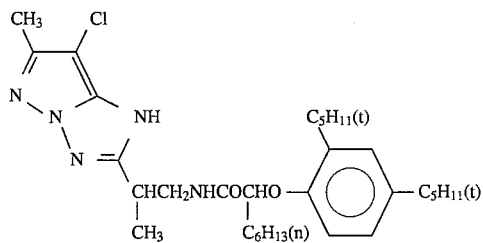 and 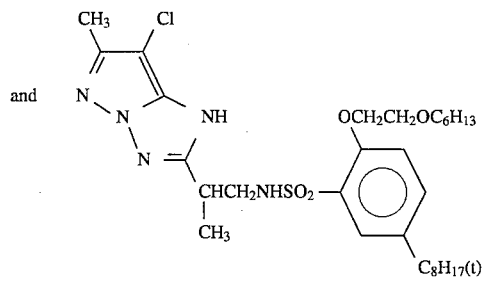
Cyan coupler (ExC)
2:4:4 mixture (weight ratio) of:
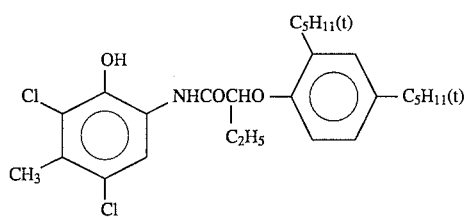 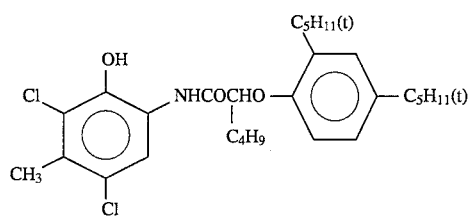
and 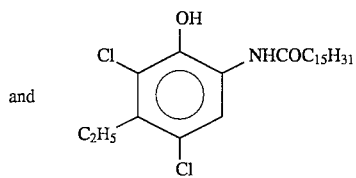
Dye stabilizer (Cpd-1)
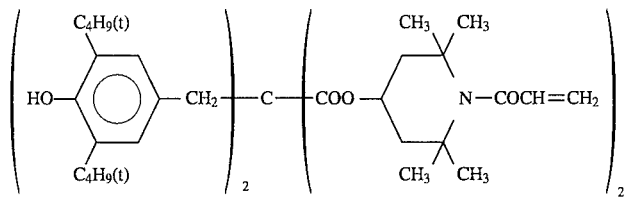
Dye stabilizer (Cpd-2)
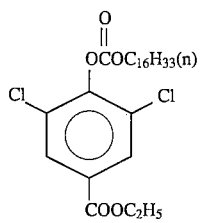
Dye stabilizer (Cpd-3)
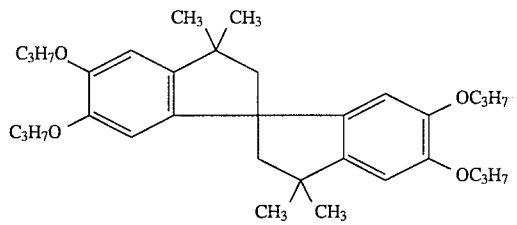
Dye stabilizer (Cpd-4)

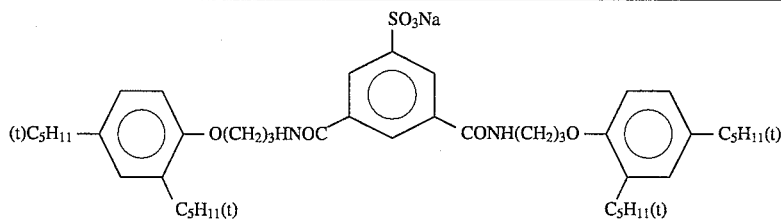
Color stain inhibitor (Cpd-5)
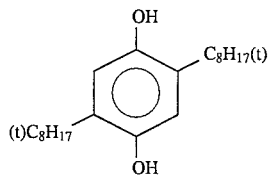
Dye stabilizer (Cpd-6)
2:4:4 mixture (weight ratio) of:
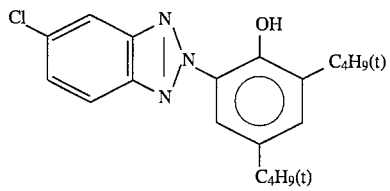
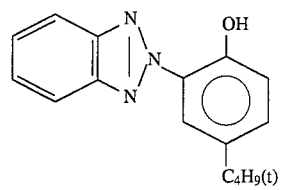
and
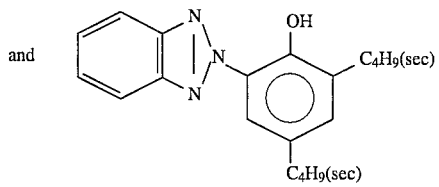
Dye stabilizer (Cpd-7)
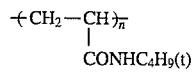
(Average molecular weight: 60,000)
Dye stabilizer (Cpd-8)
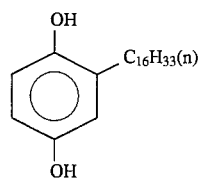
Dye stabilizer (Cpd-9)
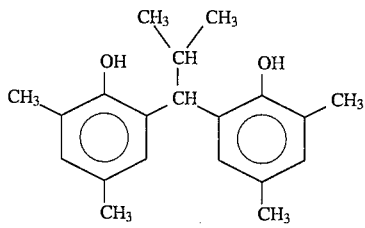
Ultraviolet absorbent
4:2:4 mixture (weight ratio) of:
(UV-1)
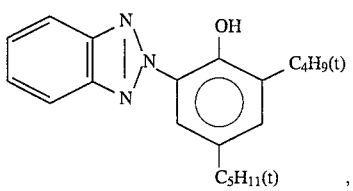
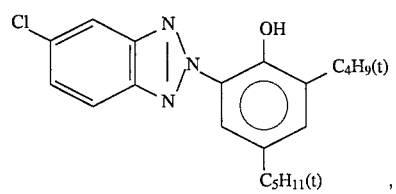

and 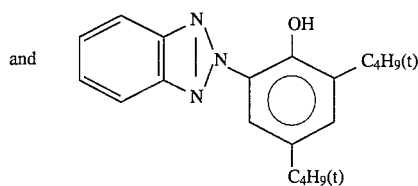

Solvent (Solv-1)

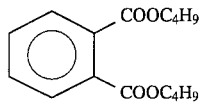

Solvent (Solv-2)

2:1 mixture (volumetric ratio) of:

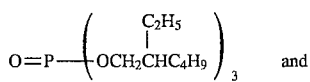 and 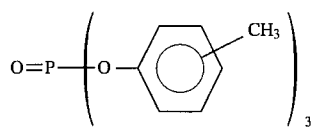

Solvent (Solv-4)    Solvent (Solv-5)

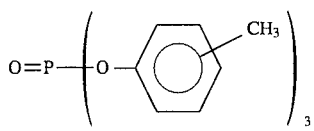    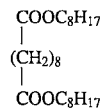

Solvent (Solv-6)

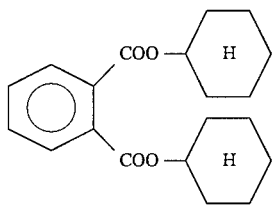

Among the samples having the multi-layer structures thus prepared, the sensitizing dyes correspond to the sample number as follows:

Sensitizing Dye (I-2)→Sample No. 1
Sensitizing Dye (I-5)→Sample No. 2
Sensitizing Dye (I-11)→Sample No. 3
Sensitizing Dye (II-2)→Sample No. 4
Sensitizing Dye (II-4)→Sample No. 5
Comparative Dye (Dye-3)→Sample No. 6
Comparative Dye (Dye-4)→Sample No. 7
Comparative Dye (Dye-5)→Sample No. 8

These samples (Nos. 1–8) were then examined for fluctuations of photographic sensitivity of the red-sensitive layer over time after the preparation of its coating solution and fluctuations of photographic sensitivity of the red-sensitive layer due to storage in the following manner.

In order to evaluate the fluctuations of the photographic sensitivity of the red-sensitive layer over time after the preparation of its coating solution, coating solutions which had been aged at a temperature of 40° C. for 30 minutes after preparation and coating solutions which had been aged at a temperature of 40° C. for 6 hours after preparation were coated on supports. The coat materials were exposed to light through an optical wedge and a red filter for 0.5 seconds, and then subjected to color development with the developer described below in the processing steps described below. In order to evaluate the fluctuations of the photographic sensitivity of the red-sensitive layer due to storage, the coated materials were aged in an atmosphere of 60° C. and 40% RH for 2 days, and then subjected to the same exposure and processing as conducted above in an atmosphere of 15° C. and 55% RH.

These samples which had been processed were measured for reflective density. From these measurements, characteristic curves were obtained.

In order to evaluate the fluctuations of the photographic sensitivity of the red-sensitive layer with time after the preparation of its coating solution, the density change ΔD of the samples after ageing at 60° C. for 6 hours (ageing of coating solution) was measured at an exposure which gives a density of 1.0 for the samples aged at 40° C. for 30 minutes. In order to evaluate the fluctuations of the photographic sensitivity due to storage, the density change ΔD (storage ageing) after ageing of the coat samples obtained by coating the coating solutions aged at 40° C. for 30 minutes was measured at an exposure which gives a density of 1.0 for the coat samples which have not been aged.

The results are set forth in Table 1.

TABLE 1

| Sample No. | Sensitizing dye No. | ΔD (ageing of coating solution) | ΔD (storage ageing) | Remarks |
|---|---|---|---|---|
| 1 | I-2 | −0.03 | −0.05 | Invention |
| 2 | I-5 | −0.05 | −0.04 | " |
| 3 | I-11 | −0.05 | 0 | " |
| 4 | II-2 | −0.03 | −0.04 | " |
| 5 | II-4 | −0.04 | −0.04 | " |
| 6 | Dye-3 | −0.12 | −0.15 | Comparison |
| 7 | Dye-4 | −0.15 | −0.20 | " |
| 8 | Dye-5 | −0.18 | −0.23 | " |

| Processing step | Temperature | Time |
|---|---|---|
| Color development | 35° C. | 45 sec. |
| Blix | 30–36° C. | 45 sec. |
| Stabilization 1 | 30–37° C. | 20 sec. |
| Stabilization 2 | 30–37° C. | 20 sec. |
| Stabilization 3 | 30–37° C. | 20 sec. |
| Stabilization 4 | 30–37° C. | 30 sec. |
| Drying | 70–85° C. | 60 sec. |

Stabilization was effected in a countercurrent process wherein the stabilizing solution flew backward from Stabilization 4 to Stabilization 1.

The composition of the various processing solutions was as follows:

| Color developer | |
|---|---|
| Water | 800 ml |
| Ethylenediaminetetraacetic acid | 2.0 g |
| Triethanolamine | 8.0 g |
| Sodium chloride | 1.4 g |
| Potassium carbonate | 25.0 g |
| N-ethyl-N-(β-methanesulfonamidoethyl)-3-methyl-4-aminoanilinesulfate | 5.0 g |
| N,N-diethylhydroxylamine | 4.2 g |
| 5,6-Dihydroxybenzene-1,2,4-trisulfonic acid | 0.3 g |
| Brightening agent (4,4'-diaminostilbene) | 2.0 g |
| Water to make | 1,000 ml |
| pH | 10.10 |
| Blix solution | |
| Water | 400 ml |
| 70% Anmonium thiosulfate | 100 ml |
| Sodium sulfite | 18 g |
| Ferric ammonium ethylenediaminetetraacetate | 55 g |
| Disodium ethylenediaminetetraacetate | 3 g |
| Glacial acetic acid | 8 g |
| Water to make | 1,000 ml |
| pH | 5.5 |
| Stabilizer | |
| 37% Formaldehyde | 0.1 g |
| Formaldehyde-sulfurous acid adjunct | 0.7 g |
| 5-Chloro-2-methyl-4-isothiazoline-3-one | 0.02 g |
| 2-Methyl-4-isothiazoline-3-one | 0.01 g |
| Copper sulfate | 0.005 g |
| Water to make | 1,000 ml |
| pH | 4.0 |

These coat samples were subjected to scanning exposure with semiconductor lasers AlGaInP (oscillating wavelength: about 670 nm), GaAlAs (oscillating wavelength: about 750 nm) and GaAlAs (oscillating wavelength: about 810 nm) as lasers. In the exposure, the sample mounted on a rotary polyhedron can be moved also in the direction perpendicular to the scanning direction of laser. An apparatus for electrically changing the exposure was used to effect scanning gradient exposure.

These exposed samples were then subjected to color development with the above-mentioned processing solutions in the above-mentioned processing steps.

These processed samples were then measured for magenta color density by means of P Type densitometer manufactured by Fuji Photo Film Co., Ltd. to determine sensitivity and fog. The reference point of optical density at which sensitivity is determined is "fog+0.2". The sensitivity is represented by the reciprocal of the exposure which gives the density. The relative sensitivity set forth in Table 2 is represented by the relative value when the sensitivity of the samples containing Sensitizing Dye (I-2) of the present invention incorporated in grains as 100.

Figure 2:
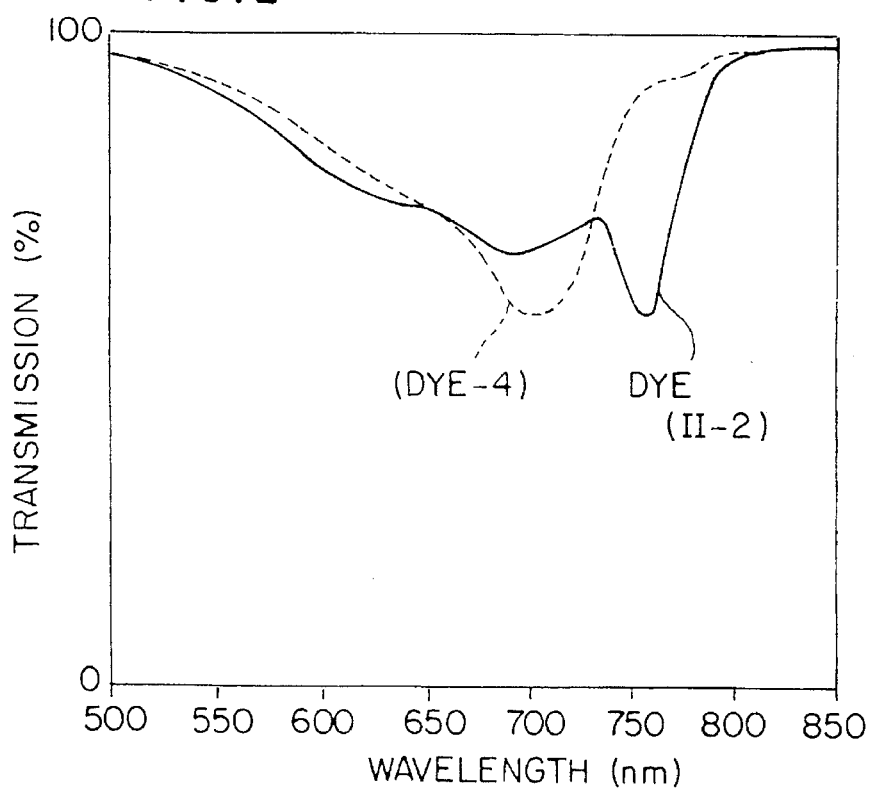
FIG. 2 shows the reflection absorption spectra of Sample No. 4 of Example 5 containing Dye (II-2) of the present invention (solid line) and Sample No. 7 of Example 5 containing Comparative Dye (Dye-4) (broken line).

The reflection absorption spectra of the silver halide emulsion to be incorporated into the third layer are illustrated in FIG. 1 and FIG. 2.

TABLE 2

| Sample No. | Sensitizing dye No. | Fog | Relative sensitivity | Remarks |
|---|---|---|---|---|
| 1 | I-2 | 0.03 | 100 (standard) | Invention |
| 2 | I-5 | 0.03 | 88 | " |
| 3 | I-11 | 0.04 | 82 | " |
| 4 | II-2 | 0.03 | 120 | " |
| 5 | II-4 | 0.03 | 76 | " |
| 6 | Dye-3 | 0.04 | 8 | Comparison |
| 7 | Dye-4 | 0.05 | 42 | " |
| 8 | Dye-5 | 0.04 | 0.1 or less | " |

FIG. 1 and FIG. 2 show that the sensitizing dyes of the present invention exhibit a sharp absorption peak based on J-aggregate in the vicinity of 750 nm. N-ethyl dyes (Dye-3 and Dye-4) in comparative examples exhibit a slight absorption peak based on J-aggregate in the vicinity of 750 nm. However, it can be seen that the peak of this absorption is small as compared with that of the sensitizing dyes of the present invention. 2,2-Dimethylpropylene crosslinking dye (Dye-5), which is widely known, exhibits no absortion in the vicinity of 750 nm under the same conditions. From the results, it can be said that the introduction of an alkoxy group into the N-alkyl group accelerates the formation of J-aggregate.

As is obvious from the comparison of the relative sensitivity at 750 nm shown in Table 2, the sensitizing dyes of the present invention give a high sensitivity as compared with the comparative dyes. The results are attributed to the introduction of an alkoxy or aryloxy group that accelerates the formation of J-aggregate which enhances the absorption at 750 nm.

As is obvious from the comparison of the storage stability of the photographic materials shown in Table 1, the sensitizing dyes of the present invention provide a high stability as compared with the comparative dyes. The results are attributed to the introduction of the alkoxy or aryloxy group that intensifies the association of J-aggregate in the vicinity of 750 nm.

These results show that the sensitizing dyes of the present invention are effective for the formation of J-aggregate at wavelength ranges longer than 700 nm as compared with the conventional sensitizing dyes in sensitivity and storage stability.

As mentioned above, the compound represented by formula (I) of the present invention is useful as a spectral sensitizer in the silver halide photographic emulsion system and can also be used as a dye. As compared with the conventional compounds, the compound represented by formula (I) of the present invention can easily form J-aggregate and provides a high sensitivity and excellent storage stability.

While the invention has been described in detail and with reference to specific embodiments thereof, it will be apparent to one skilled in the art that various changes and modifications can be made therein without departing from the spirit and scope thereof.

What is claimed is:

1. A methine dye, represented by formula (I):

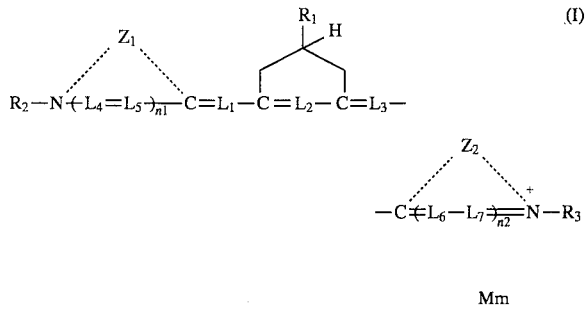

wherein $Z_1$ and $Z_2$ each represents an atomic group required for the formation of a benzothiazole nucleus; $R_1$ represents an unsubstituted or substituted alkyl, aryl or heterocyclic group; $R_2$ and $R_3$ each represents an alkyl group substituted by an alkoxy or aryloxy group; $L_1$, $L_2$, $L_3$, $L_4$, $L_5$, $L_6$ and $L_7$ each represents a methine group which may be substituted or unsubstituted; $n_1$ and $n_2$ each represents an integer 0 or 1; M represents a charge neutralizing ion; and m represents 0 or a higher number required for the neutralization of electric charge in the dye.

2. The methine dye as in claim 1, wherein $R_1$ is an unsubstituted alkyl or aryl group.

3. The methine dye as in claim 1, wherein $R_1$ is a methyl, ethyl or phenyl group.

4. The methine dye as in claim 1, wherein $L_1$, $L_2$, $L_3$, $L_4$, $L_5$, $L_6$ or $L_7$ represents an unsubstituted methine group or a methine group substituted by a methyl, phenyl, or methoxy group.

5. The methine dye as in claim 1, wherein $R_1$ represents an alkyl group.

6. The methine dye as in claim 1, wherein $R_1$ represents an aryl group.

7. The methine dye as in claim 1, wherein $n_1$ and $n_2$ each represents 0.

8. The methine dye as in claim 1, wherein $L_1$, $L_2$, $L_3$, $L_4$, $L_5$, $L_6$ and $L_7$ each represents an unsubstituted methine group.

9. The methine dye as in claim 1, wherein $R_2$ and $R_3$ each represents a methoxyethyl group, an ethoxyethyl group or a phenoxyethyl group.

* * * * *